(12) United States Patent
Groner et al.

(10) Patent No.: US 10,236,665 B2
(45) Date of Patent: Mar. 19, 2019

(54) INSULATED ELECTRICAL SWITCH CABINET COVER

(71) Applicant: Infratech Corporation, Kennesaw, GA (US)

(72) Inventors: Robert Albert Groner, Beverly Hills, FL (US); Stephen August Karle, Indialantic, FL (US)

(73) Assignee: INFRATECH CORPORATION, Kennesaw, GA (US)

( * ) Notice: Subject to any disclaimer, the term of this patent is extended or adjusted under 35 U.S.C. 154(b) by 0 days.

(21) Appl. No.: 15/426,383

(22) Filed: Feb. 7, 2017

(65) Prior Publication Data

US 2018/0138668 A1    May 17, 2018

Related U.S. Application Data

(60) Provisional application No. 62/421,509, filed on Nov. 14, 2016.

(51) Int. Cl.
| | |
|---|---|
| *H02B 1/30* | (2006.01) |
| *H02B 1/40* | (2006.01) |
| *H02B 1/46* | (2006.01) |
| *H02B 1/48* | (2006.01) |
| *H02B 1/42* | (2006.01) |
| *H02B 1/14* | (2006.01) |

(52) U.S. Cl.
CPC ............... *H02B 1/306* (2013.01); *H02B 1/14* (2013.01); *H02B 1/42* (2013.01); *H02B 1/48* (2013.01)

(58) Field of Classification Search
None
See application file for complete search history.

(56) References Cited

U.S. PATENT DOCUMENTS

| | | | | |
|---|---|---|---|---|
| 5,067,043 | A * | 11/1991 | Markowski | H02B 1/056 361/611 |
| 6,472,605 | B1 * | 10/2002 | Griffith | H02B 1/056 174/101 |
| 6,765,787 | B2 * | 7/2004 | Beasley, III | H02B 1/52 174/480 |
| 8,902,570 | B2 * | 12/2014 | Cosley | H02B 1/42 200/50.32 |
| 9,224,548 | B2 * | 12/2015 | Dunker | H01H 9/104 |
| 2007/0053142 | A1 * | 3/2007 | Allen | H01H 9/0264 361/647 |
| 2010/0110616 | A1 * | 5/2010 | Edel | H02B 1/42 361/642 |
| 2015/0036267 | A1 * | 2/2015 | Miller | H02B 1/03 361/625 |

(Continued)

*Primary Examiner* — Courtney Smith
(74) *Attorney, Agent, or Firm* — Thomas | Horstemeyer, LLP (57) ABSTRACT

A temporary insulating switch cabinet cover is installed in the doorway of an electrical switch cabinet having high voltage energized switchgear in order to enable a worker to perform maintenance tasks on the switchgear while the switchgear is energized. The cover is designed to expose a part of the energized switchgear while covering and isolating another part of the energized switchgear so that a worker is enabled to work on the exposed part of the energized switchgear while being protected and insulated from the unexposed covered part of the energized switchgear.

13 Claims, 6 Drawing Sheets

(56) References Cited

U.S. PATENT DOCUMENTS

2016/0172128 A1* 6/2016 Crowell .................. H02B 1/06
                                                   200/297
2016/0241007 A1* 8/2016 Tremaine ............... H02G 3/123
2018/0061603 A1* 3/2018 Hendrixson, III ..... H01H 71/68

* cited by examiner

INSULATED ELECTRICAL SWITCH CABINET COVER

CLAIM OF PRIORITY

This application claims priority to provisional U.S. application No. 62/421,509, filed Nov. 14, 2016, which is incorporated herein by reference in its entirety.

BACKGROUND OF THE INVENTION

Safety is an issue when performing maintenance on electrical switchgear in an energized electrical switch cabinets, which can operate at high voltages, for example, 50 kilovolts (KV). Maintenance on the switchgear may involve removing and/or installing a new cable, terminator, breaker, or fuse in the electrical switch cabinet.

There are different types of high voltage switchgear in use, for example, switchgear manufactured by McGraw Edison Company, U.S.A., and switchgear manufactured by S&C Electric Company, U.S.A. Also, there are different sizes of cabinets in use, some wider than others.

Typically, the only real safe way to perform this maintenance work is to have the switch cabinet de-energized, or switched off. Unfortunately, this de-energization is burdensome and undesirably causes additional expense to the power company and the electrical contractors that typically perform the work, as well as inconveniences the power company's customers with power outages.

SUMMARY OF THE INVENTION

The present disclosure provides embodiments of a portable insulating electrical switch cabinet cover for temporary installation in a high voltage switch cabinet for protecting a worker while the worker performs maintenance on switchgear that is energized in the switch cabinet.

One embodiment, among others, is a switch cabinet cover that is installed in the doorway of the electrical switch cabinet that has high voltage energized switchgear in order to enable a worker to perform maintenance tasks on the switchgear while the switchgear is energized. The switch cabinet cover is designed to expose a part of the energized switchgear while covering and isolating another part of the energized switchgear so that a worker is enabled to work on the exposed part of the energized switchgear while being protected and insulated from the unexposed covered part of the energized switchgear.

Another embodiment, among others, is an electrical switch cabinet cover having a plurality of parts. Each part has a planar front face and a side wall extending at a right angle from the front face. Each side wall has a plurality of holes. A plurality of screws with respective nuts pass through the respective holes in order to attach the plurality of parts to create a parts combination having a front face. The parts combination front face comprises the plurality of parts front faces. At least one handle extends outwardly from the front face of the parts combination. The parts combination is of a size and shape to enable placement of the parts combination within the energized electrical switch cabinet to expose a part of the switchgear at the front face of the parts combination while covering a part of the switchgear at the front face of the parts combination so that the worker is enabled to work on the exposed part of the switchgear while being protected and insulated from the unexposed covered part of the switchgear. The parts, screws, and handles are made of an electrically nonconductive material in relation to electrical power associated with the energized switchgear.

Other embodiments, apparatus, devices, systems, features, characteristics, and methods of the present invention will become more apparent in the Detailed Description of Embodiments and accompanying drawings and claims, all of which form a part of this specification.

BRIEF DESCRIPTION OF THE DRAWINGS

The various embodiments and features of the invention will be clearly depicted in the following drawings. The components in the drawings are not necessarily to scale, emphasis instead being placed upon clearly illustrating the principles of the embodiments of the present disclosure. Moreover, in the drawings, like reference numerals designate corresponding parts throughout the several views.

DETAILED DESCRIPTION OF EMBODIMENTS

The present disclosure provides a plurality of kits that can be used to temporarily install an insulating electrical switch cabinet cover in a high voltage switch cabinet in order to protect a worker while the worker performs maintenance tasks on parts of the high voltage switchgear within the cabinet.

A first kit is used for narrow and wide switch cabinets having McGraw Edison switchgear. The first kit contains a plurality of rigid pieces that are attached together to form a parts combination that is then placed in the energized electrical switch cabinet. The first kit includes a main body 11 of FIG. 1A, one narrow side box 13 of FIG. 1B, one wide side box 15 of FIG. 1C, two side covers 17 of FIG. 1D, and screws 19 with washers 21 and wingnuts 23 as shown in FIG. 2. The wide side box 15 is used in the wide cabinet with the McGraw Edison switchgear.

Figure 1A:
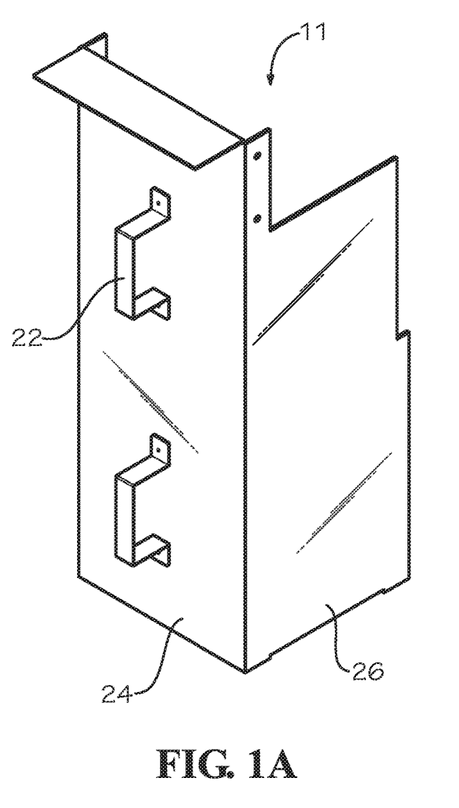
FIGS. 1A through 1D show parts in a first kit that is used to create a plurality of first embodiments of an insulating electrical switch cabinet cover of the present disclosure.
Figure 1B:
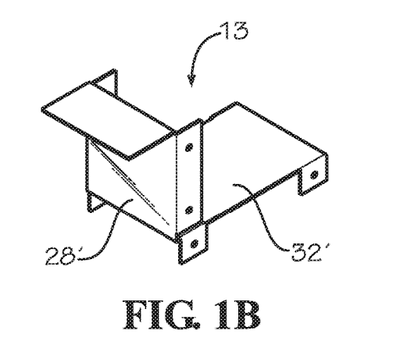
Figure 1C:
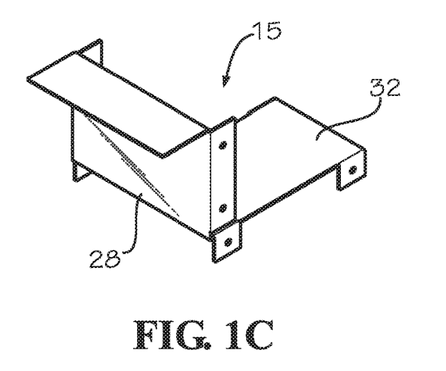
Figure 1D:
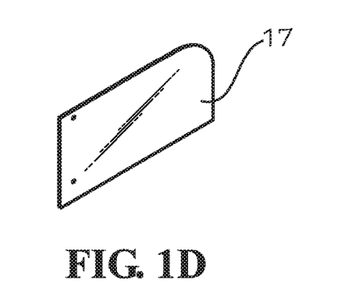
Figure 2:
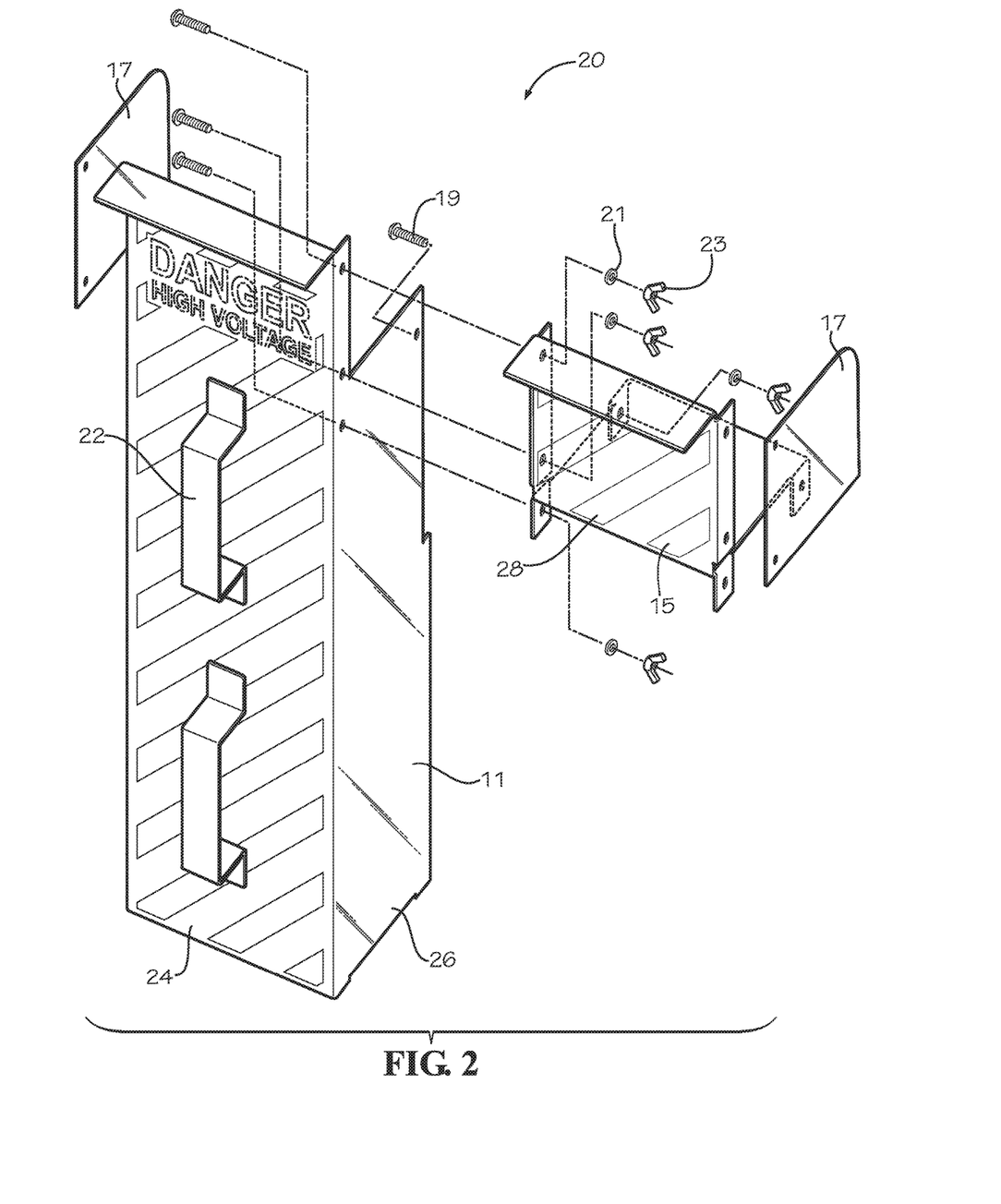
FIG. 2 is an assembly view in perspective of a first embodiment of the insulating electrical switch cabinet cover that has been created from the first kit parts of FIGS. 1A and 1C.

FIG. 2 is an assembly view in perspective of a first embodiment of the insulating electrical switch cabinet cover 20 that has been created from the first kit parts of FIGS. 1A and 1C. The main body 11 has a planar front face 24 and a side wall 26 extending rearwardly from the front face 24. The side box 15 has a planar front face 28 and a bottom wall 32 extending rearwardly at a right angle from the front face 28. Although not used in this first embodiment, the narrow side box 13 has a planar front face 28' and a bottom wall 32' extending rearwardly at a right angle from the front face 28. Other first embodiments are possible by using the parts in the first kit. For example, the wide side box 15 could be situated on the left side of the main body 11 as opposed to the right side, the narrow side box 13 could be placed on either side of the main body 11, some embodiments may not require a side box at all, one or both of the side covers 17 may or may not be used, etc.

As further illustrated in FIG. 2, the switch cabinet cover 20 has one or more C-shaped handles 22 extending outwardly from the front face of the parts combination. In the preferred embodiment, there are two handles 22, one situated vertically below the other on the front face of the main body 11. The handles 22 are of sufficient size and shape to enable a worker 61 (FIG. 7) to easily maneuver the cover to provide easy installation and removal.

In the preferred embodiments, the pieces of the switch cabinet cover are assembled together using electrically non-conductive screws 19, washers 21, and wingnuts 23, preferably made of nylon. Placement of the wingnuts 23 is important when the wingnuts 23 are used to attach the boxes 13 and 15 or side plates 17. Wingnuts 23 should not be placed on the outside of any of the cover 20 when using the first kit to cover in the narrow cabinet with the McGraw Edison switchgear. When attaching the side boxes 13 and 15 to the main body 11, the wingnuts 23 are kept on the box side, not the main body side. When wingnuts 23 are placed in other positions, the wingnuts 23 may hit objects in the cabinet or switch barrier boards and prevent installation of the switch cabinet cover 20.

In alternative embodiments, the pieces of the cover 20 can be attached together with other connecting apparatus, for example, one or more non-conducting screws with hexagonal nuts, glue, hook and loop attachments (e.g., Velcro®), magnetic attachments, etc.

In the preferred embodiments, the cover is made of a non-conducting material that is commercially available under the product name "Makrolon GP Transparent Polycarbonate," which is manufactured and sold by Bayer Material Science, Sheffield, Mass., U.S.A. This material is generally a transparent plastic material and has dielectric specifications as follows: 380 Volts per mil thickness, material thickness of 177 mil, and dielectric quality of 67 kv+. Many other types of material can be used in place of this preferred material.

A second kit is used for narrow and wide cabinets having S&G switchgear. The second kit contains a plurality of rigid pieces that are attached together to form a parts combination that is then placed in the energized electrical switch cabinet. The second kit contains a main body 31 of FIG. 3A, a side box 33 of FIG. 3B, 2 side covers 35 of FIG. 3C, and screws 19 with washers 21 and wingnuts 23. The main body 31 has a planar front face 34 and parallel side walls 36a and 36b extending rearwardly from the front face 34. The side box 33 has a planar front face 38 and a bottom wall 39 extending rearwardly at a right angle from the front face 38.

Figure 3A:
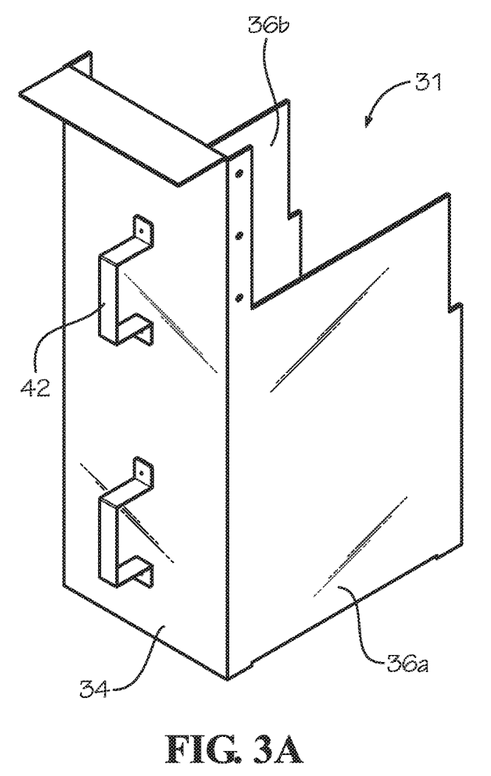
FIGS. 3A through 3C show parts in a second kit that is used to create a plurality of second embodiments of an insulating electrical switch cabinet cover of the present disclosure.
Figure 3B:
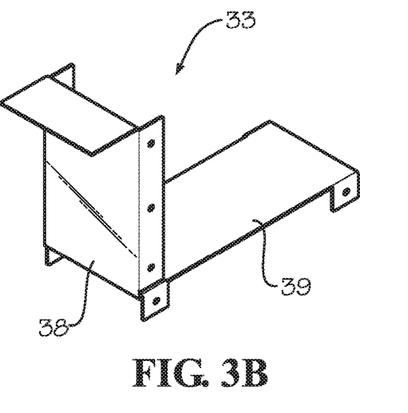
Figure 3C:
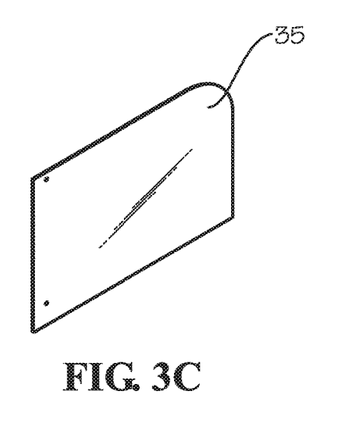
Figure 4:
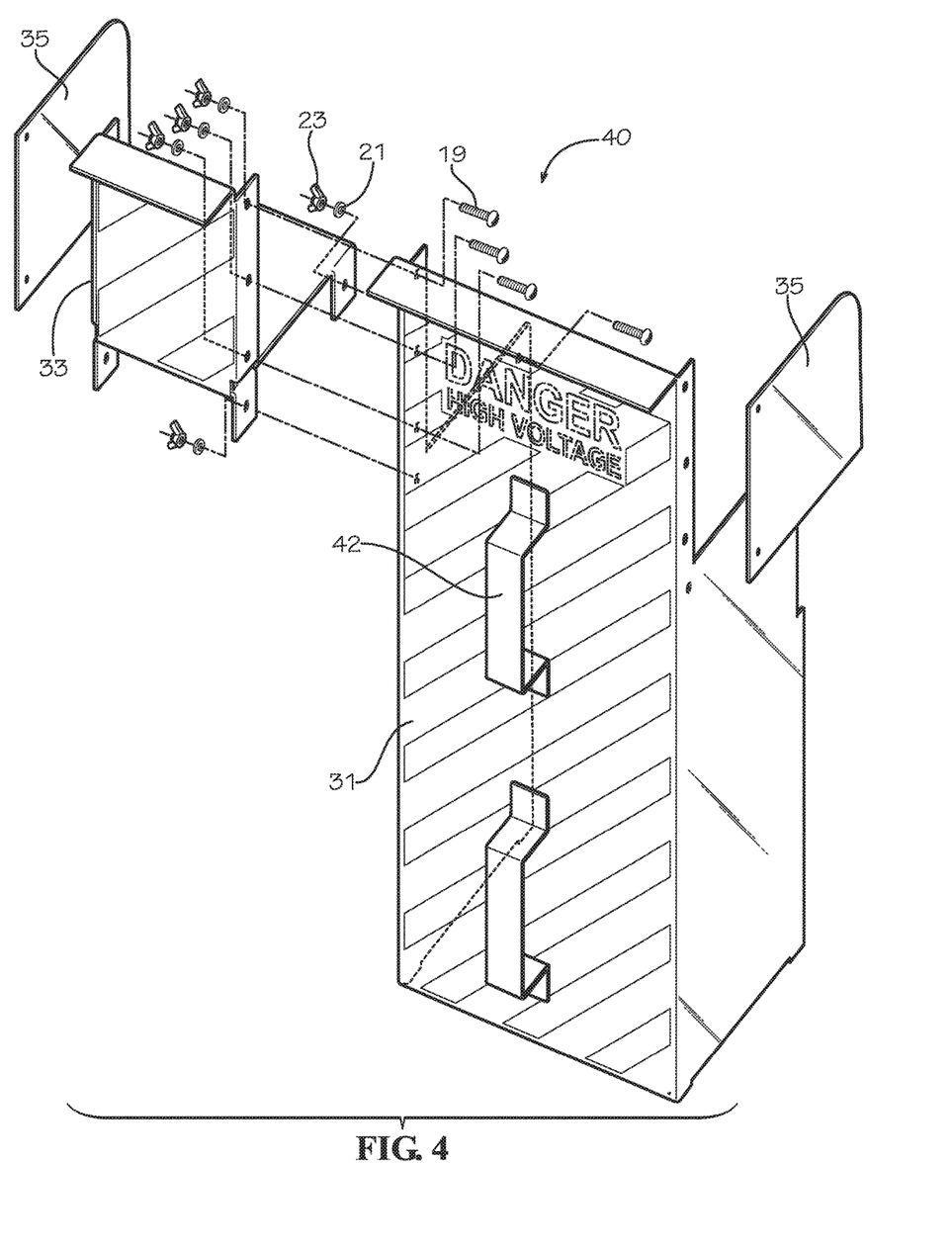
FIG. 4 is am assembly view in perspective of a second embodiment of the insulating electrical switch cabinet cover that has been created from the second kit parts of FIGS. 3A and 3B.

FIG. 4 is an assembly view in perspective of a second embodiment of the insulating electrical switch cabinet cover 40 that has been created from the second kit parts of FIGS. 3A and 3B. This cover 40 can be installed in a wide cabinet having S&G switchgear. In the second embodiment, as shown in FIG. 4, the main body 31 and the side box 33 are used. The side plates 35 on the right side of the main body 31 and the left side of the small box are not used. The side plates 35 can be used, but the switch cabinet cover 40 is so close to the cabinet sides, use of the side plates 35 is not necessary. Other second embodiments are possible with the parts in the second kit.

The switch cabinet cover 40 has one or more C-shaped handles 2 extending outwardly from the front face of the parts combination. In the preferred embodiment, there are two handles 22, one situated vertically below the other on the front face of the main body 11.

Figure 5:
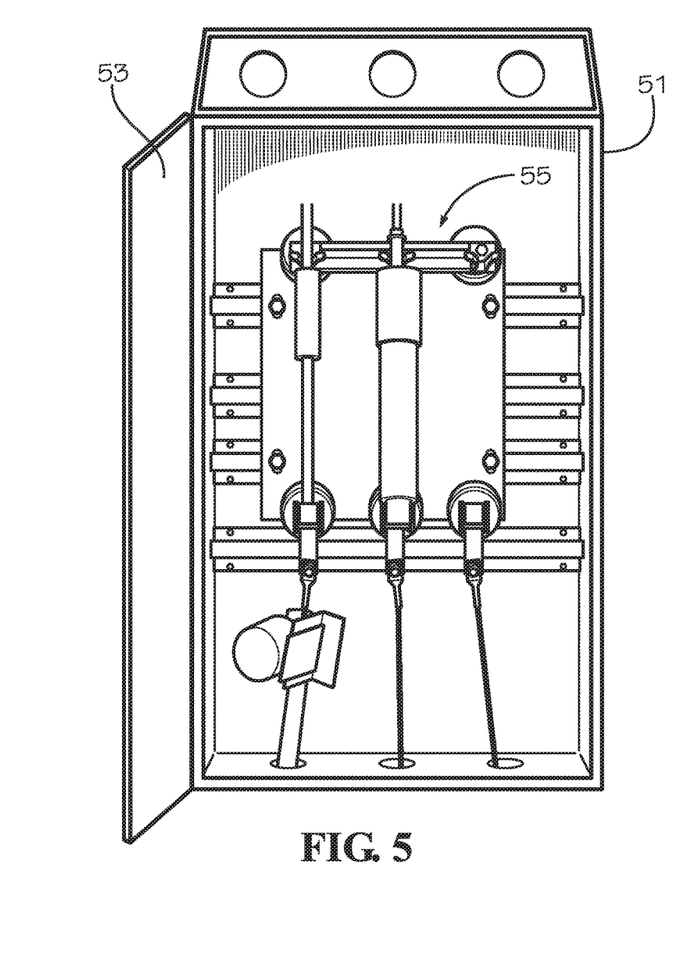
FIG. 5 is a front view of an electrical switch cabinet of the prior art.

FIG. 5 is a front view of a narrow switch cabinet 51 with door 53 in an open position to show the McGraw Edison switchgear 55 situated therein.

Figure 6:
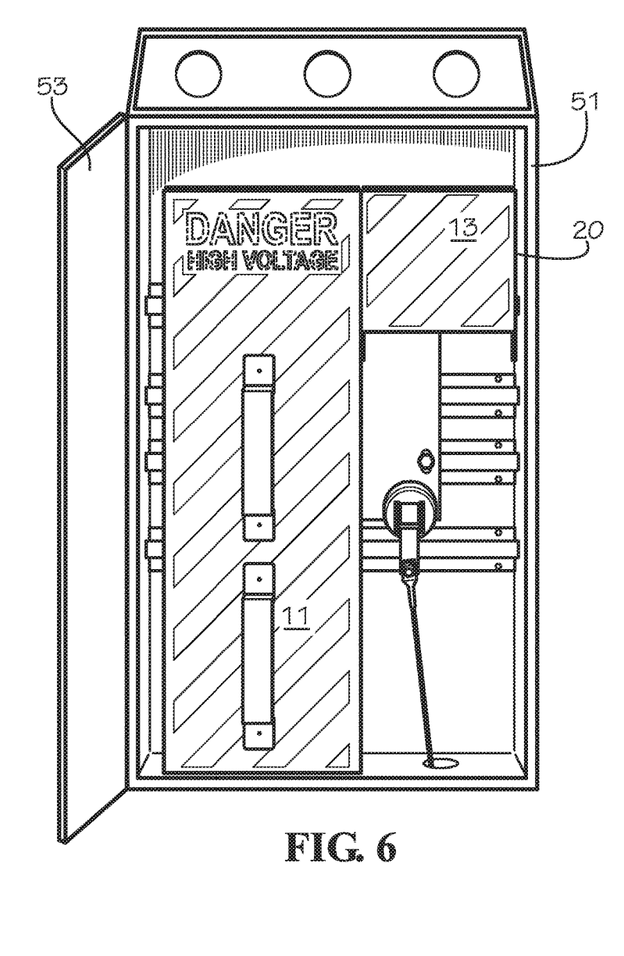
FIG. 6 is a front view of the insulating electrical switch cabinet cover of FIG. 2 installed in the prior art switch cabinet of FIG. 5.

FIG. 6 shows the first embodiment of the switch cabinet cover 20 installed in the narrow cabinet having McGraw Edison switchgear. In this first embodiment of the switch cabinet cover 20, the main body 11 and small side box 13 from the first kit are utilized. Although not necessary, the side covers 17 in the first kit can be used if extra cover is desired at one or both sides at the top. In this application, the wide side box 15 (FIG. 1C) in the first kit is not needed.

When installing the electrical switch cabinet cover 20 in a wide cabinet with McGraw Edison switchgear, the main body 11 and the large side box 15 (FIG. 1C) of the first kit are used. Also, the side plates 17 are used on the left side of the main body 11 and on the side of the large box 15. In this application, there is a large gap between the sides and the cover, making use of the side plates 17 desirable, if not necessary.

Figure 7:
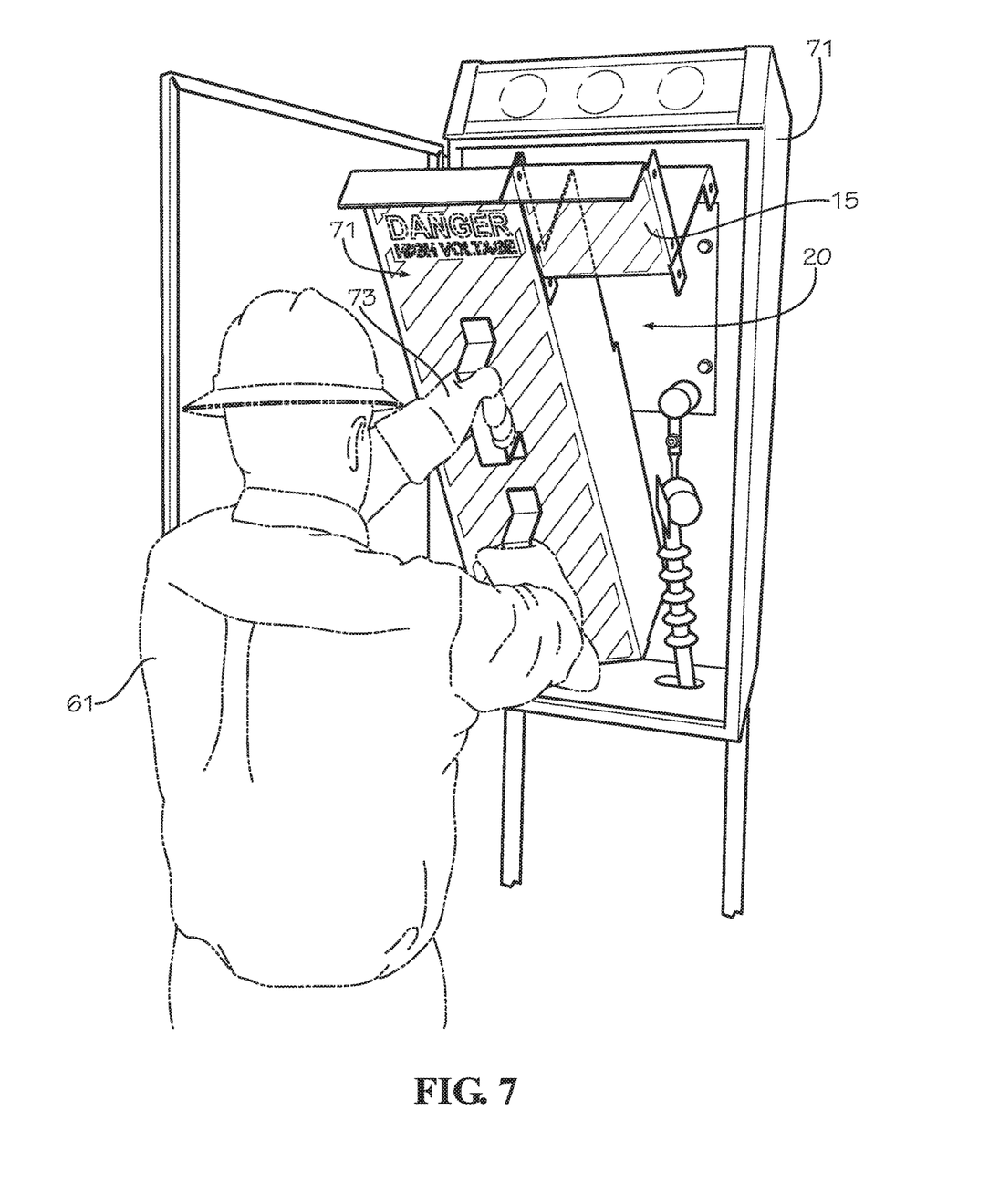
FIG. 7 is a perspective view of a worker (e.g., electrical technician) installing or removing the insulating electrical switch cabinet cover of FIG. 2 in or from, respectively, the prior art switch cabinet of FIG. 5.

FIG. 7 is a perspective view showing a worker 61 installing, or in the alternative, removing, the insulating electrical switch cabinet cover 20 in or from, respectively, the prior art wide switch cabinet 71 with McGraw Edison switchgear. During installation, the worker 61 wearing insulating gloves 73 and overshoes (not shown) places the assembled cover 20 into the cabinet 71, while standing on an insulating switch mat. The cover 20 is placed inside the front lip and tilted back at the top and slid to the back of the switch cabinet 71. The process is reversed to remove the insulating electrical switch cabinet cover 20.

It should be emphasized that the above-described embodiments of the present disclosure are merely a possible non-limiting examples of implementations, merely set forth for a clear understanding of the principles of the invention. Many variations and modifications may be made to the above-described embodiments of the present disclosure without departing substantially from the spirit and principles of the present invention. All such modifications and variations are intended to be included herein within the scope of this disclosure.

As an example of a variation, the dimensions of the electrical switch cabinet covers 20 and 40 can be modified so that the covers can be used in connection with (a) an electrical switch cabinet that is different than the narrow and wide cabinets described and illustrated in the present disclosure or (b) switchgear that is manufactured by a party other than McGraw Edison and S&G.

At least the following is claimed:

1. An apparatus comprising a combination, as follows:
   an electrical switch cabinet having a housing with an open door creating a doorway and energized switchgear contained within the cabinet; and
   a portable temporary cover installed in the doorway created by the open door, the cover exposing a part of the energized switchgear while covering a part of the energized switchgear so that a worker is enabled to work on the exposed part of the energized switchgear while being protected and insulated from the unexposed covered part of the energized switchgear, wherein the portable temporary cover comprises a plurality of planar parts and attachment means for attaching the planar parts to each other and wherein the planar parts comprise:

a main body having a planar front face and a side wall extending rearwardly from the main body front face into the cabinet, the main body side wall separating the exposed part from the unexposed part; and a side box having a planar front face and a bottom wall extending rearwardly from the side box front face, the bottom wall separating the exposed part from the unexposed part.

2. The apparatus of claim 1, wherein the portable temporary cover is made of a plastic capable of insulating the worker from the switchgear rated at 50 kilovolts (KV).

3. The apparatus of claim 1, further comprising at least one handle extending outwardly from at least one of the planar parts, the at least one handle being C-shaped and of sufficient size to enable hands associated with the worker to grasp the at least one handle to install and remove the portable temporary cover from the cabinet.

4. The apparatus of claim 1, wherein the attachment means comprises a plurality of screws with respective nuts that pass through respective holes in the planar parts.

5. The apparatus of claim 4, wherein each of the planar parts has a planar front face and a side wall extending at a right angle from the front face in a rearward direction into the cabinet so that the side walls of adjacent planar parts are contiguous, each side wall having one or more of the plurality of holes that align with respective one or more of the plurality of holes of an adjacent side wall, the holes receiving the screws.

6. The apparatus of claim 4, wherein the screws and wingnuts are made from nylon.

7. A portable insulating electrical switch cabinet cover for temporary installation in an energized electrical switch cabinet for insulating a worker from an energized electrical part while the worker performs a maintenance task, the cover comprising:

a plurality of parts, each part having a planar front face and a side wall extending at a right angle from the front face, each side wall having a plurality of holes;

a plurality of screws with respective nuts and passing through respective holes in order to attach the plurality of parts to create a parts combination having a front face;

at least one handle extending outwardly from the front face of the parts combination;

wherein the parts combination is of a size and shape to enable temporary placement of the parts combination within the energized electrical switch cabinet to expose a part of switchgear at the front face of the parts combination while covering a part of the switchgear at the front face of the parts combination so that the worker is enabled to work on the exposed part of the switchgear while being protected and insulated from the unexposed covered part of the switchgear; and wherein the parts combination, screws, and the at least one handle are made of an electrically nonconductive material to protect from electrical power associated with the energized switchgear.

8. The cover of claim 7, wherein the cover is made of a plastic capable of insulating the worker from the switchgear rated at 50 kilovolts (KV).

9. The cover of claim 7, further comprising the energized electrical switch cabinet with an open door and wherein the cover is situated within a doorway created by the open door so that the worker is enabled to work on the exposed part of the switchgear while being protected and insulated from the unexposed covered part of the switchgear.

10. The cover of claim 9, wherein the side wall of at least one of the planar parts extends rearwardly to an extent that is sufficient to extend between and separate the exposed part from the unexposed part.

11. The cover of claim 7, wherein the handle has a C-shaped configuration and is of sufficient size to enable a hand associated with the worker to grasp the handle to install and remove the cover from the energized electrical switch cabinet.

12. A kit for assembling a portable cover for temporary installation in an energized electrical switch cabinet for insulating a worker from energized electrical parts while the worker performs maintenance tasks, the kit comprising:

a plurality of parts, each part having a planar front face and a side wall extending at a right angle from the front face, each side wall having a plurality of holes;

a plurality of screws with respective nuts, the screws having a size to enable passage through the holes in order to attach the plurality of parts in order to enable creation of a parts combination having a front face;

at least one handle extending outwardly from the front face of the parts combination;

wherein the parts combination is of a size and shape to enable placement of the parts combination within the energized electrical switch cabinet to expose a part of the switchgear at the front face of the parts combination while covering a part of the switchgear at the front face of the parts combination so that the worker is enabled to work on the exposed part of the switchgear while being protected and insulated from the unexposed covered part of the switchgear;

wherein the side wall of at least one of the planar parts extends from the front face to an extent that is sufficient to extend between and separate the exposed part from the unexposed part; and wherein the parts combination, screws, and at least one handle are made of an electrically nonconductive material.

13. A method for enabling the worker to assemble and utilize the insulating electrical switch cabinet cover without de-energizing the switchgear within the electrical switch cabinet, the method comprising:

providing a kit as defined in claim 11;

attaching the parts to create the parts combination;

opening a door of the electrical switch cabinet in order to create a doorway and to expose the switchgear through the doorway;

placing the parts combination in the doorway of the energized electrical switch cabinet to expose the exposed part of the switchgear while covering the covered part of the switchgear;

performing a maintenance task on the exposed part of the switchgear in the cabinet;

removing the parts combination from the doorway of the energized electrical switch cabinet; and closing the door of the energized electrical switch cabinet.

* * * * *